US006003651A

United States Patent [19]

Waller et al.

[11] Patent Number: 6,003,651

[45] Date of Patent: Dec. 21, 1999

[54] SENSING OF COIN OUTPUT FROM A GAMING DEVICE TO REDUCE INCORRECT NUMBER OF COINS OUTPUT

[75] Inventors: Daniel J. Waller; Joseph R. Hedrick, both of Reno; Ted M. Gail, Sparks; Ben Elie Isaac, Reno, all of Nev.

[73] Assignee: International Game Technology, Reno, Nev.

[21] Appl. No.: 08/969,605

[22] Filed: Nov. 13, 1997

[51] Int. Cl.[6] .............................. G07F 3/00; G01N 21/86

[52] U.S. Cl. ......................................... 194/202; 250/559.4

[58] Field of Search ..................................... 194/202, 203, 194/334, 338, 328; 250/559.4, 559.41, 559.45, 214 B

[56] References Cited

U.S. PATENT DOCUMENTS

| | | | |
|---|---|---|---|
| 3,264,630 | 8/1966 | Conklin | 250/559.4 |
| 5,516,293 | 5/1996 | Heidel et al. | 250/214 B |

FOREIGN PATENT DOCUMENTS

| | | | |
|---|---|---|---|
| 0178278 | 12/1984 | European Pat. Off. | 194/202 |

*Primary Examiner*—F. J. Bartuska
*Assistant Examiner*—Bryan Jaketic
*Attorney, Agent, or Firm*—Sheridan Ross P.C.

[57] ABSTRACT

A gaming device is provided with detectors configured to substantially reduce the potential for unauthorized manipulation of a coin output system. A pair of detectors can be used to output an error signal when the sequence or timing of detector blockages departs from that which would be expected from normal coin movement. A second optical detector is configured to provide a signal used to output an error signal when the second detector detects radiation or light during a time that a first detector is also detecting light from a paired radiation source. An error signal is preferably output when an optical detector is blocked for a period of time which exceeds a maximum blockage threshold, and preferably the threshold may be dynamically adjusted. In one embodiment, a sensor in or adjacent an output hopper is used to predict coin output from the hopper and an error signal is generated when more than a predetermined period of time passes, following a coin output prediction, without a coin being detected by a downstream optical detector.

17 Claims, 7 Drawing Sheets

SENSING OF COIN OUTPUT FROM A GAMING DEVICE TO REDUCE INCORRECT NUMBER OF COINS OUTPUT

FIELD OF THE INVENTION

The present invention relates to sensing of coins output by a gaming device and in particular to coin sensing with reduced susceptibility to unauthorized manipulation.

BACKGROUND OF THE INVENTION

A number of gaming devices, such as slot machines, poker or other card game machines, Keno machines and the like, are capable of operating in a mode in which some or all prizes or awards as a result of gaming are paid by dispensing a plurality of coins from the gaming terminal. Typically, gaming terminal accumulates coins and, in response to a win event, dispenses or outputs a number of coins, depending upon the type of win, as established in, e.g., a pay table for the machine. In a number of such machines, the payout is controlled by a microprocessor which initiates the payout process, then continuously compares the number of coins dispensed to the number of coins in the prize, terminating dispensing of the coins once the number of coins defined for the prize has been dispensed. For example, in a slot machine, when a predetermined reel combination, such as three 7's, appears at the reel stop positions, the microprocessor will consult a pay table such as a table stored in memory and determine that N coins should be dispensed as the prize for such result. The number N is stored in a memory, or a counter, by the microprocessor. The microprocessor will send a signal to an output hopper causing the hopper to begin dispensing coins. A signal from a coin sensor along the coin output path is used to decrement the counter or memory location until a value of zero is achieved in the counter or memory location, whereupon the microprocessor issues a signal causing the hopper to cease dispensing coins.

As can be seen from the above description, there is a potential for dispensing an incorrect number of coins as a result of, among other possibilities, the signals from the coin output sensor incorrectly reflecting the coins actually dispensed. Such inaccurate coin count, although potentially arising from hardware or software failure or errors, is sometimes the result of an unauthorized manipulation of the coin output sensing system.

Accordingly, it would be useful to provide a gaming device in which there was a reduced potential for unauthorized manipulation of the coin output sensing or control system.

SUMMARY OF THE INVENTION

The present invention provides a coin output sensing system which is less susceptible to manipulation than certain previous systems. In one embodiment, two or more sensors are positioned along the coin output path. By providing multiple sensors, it is possible to detect certain types of manipulation (such as the providing of unauthorized light sources for triggering various optical detectors). Two or more detectors can be used in a fashion to normally determine the direction of coin movement, which assists in defeating those unauthorized manipulations which involve blocking an optical sensor (since such blockage cannot easily be performed in a manner which simulates coin movement in the proper direction or at the proper speed). In another embodiment, coin detector time windows, thresholds or limits are dynamically adjusted in a fashion which reduces the potential for unauthorized manipulation. For example, the amount of time an optical detector is blocked by a coin of a known denomination as it moves along the coin path can be measured and used to define a maximum blockage time which is permitted before an error condition is declared.

In one embodiment, a detector upstream of the coin exit path, such as a detector in or adjacent the output hopper, is used to predict output of a coin so that e.g an over-long delay before detection of a coin can be used to establish an error condition.

By using some or all of the improved coin output features of the present invention, overall potential for unauthorized manipulation of the system can be diminished.

DETAILED DESCRIPTION OF THE PREFERRED EMBODIMENTS

Figure 1:
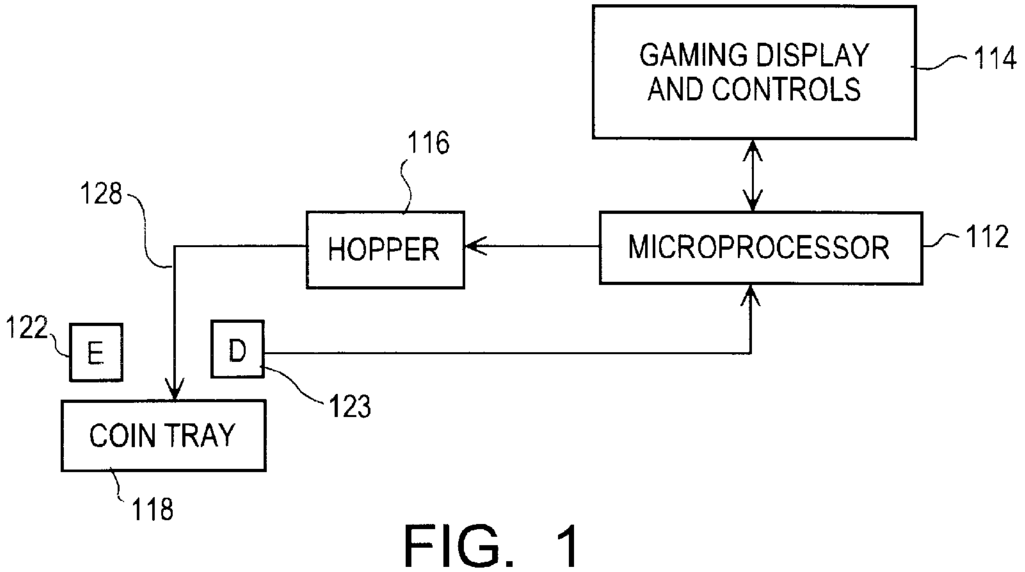
FIG. 1 Prior Art
FIG. 1 is a block diagram of portions of a gaming terminal and coin output system according to previous devices.

Before describing features of the present invention, components of certain previous coin output systems will be discussed. In certain previous systems, as depicted in FIG. 1, a microprocessor 112 is coupled to various gaming display and control components 114. In the case, for example, of a slot machine, the display and control components may include a plurality of controllable slot machine reels (in the case of a mechanical or quasi-mechanical slot machine), a display screen (e.g., in the case of an electronic slot machine), wager acceptors such as coin acceptors, bill acceptors, card readers and the like, input devices such as a spin arm or lever, a spin button, touch screen controls and the like.

A hopper 116 controlled by the microprocessor 112 contains a plurality of coins typically obtained from coin wagers placed by players. The hopper 116 will accumulate coins, (at least up to a predetermined level), until such time as instructed by the microprocessor 112 to begin dispensing or outputting coins to a coin tray 118 (e.g. in response to a win). Upon detection of a win, the microprocessor will store in a memory location or counter (not shown) a value indicating the number of coins to be paid out by the hopper. Typically, this value will be obtained from a table stored in a memory (not shown). The microprocessor 112 sends a signal to the hopper 116 causing the hopper to begin dispensing coins. An optical sensing system consisting of a radiation (e.g optical) emitter such as a light emitting diode 122 (preferably on infra-red LED) is positioned opposite a radiation (e.g. optical) detector 123 so that as coins move along the coin path 128 toward the coin tray 118, each coin will, in turn, block the light (or other radiation) normally traveling from the emitter 122 to the detector 123. A signal indicative of such light blockage is transmitted 132 to the microprocessor 112 which decrements the counter in response to such indication of blockage. Accordingly, each coin traveling along coin path 128 will, under ideal circumstances, cause the value in the counter to decrement by 1. When the microprocessor 112 detects that the counter has reached a value of zero (indicating that N coins have been dispensed), the microprocessor 112 sends a signal to the hopper 116 causing it to cease dispensing coins.

According to one type of unauthorized manipulation, a light source was inserted, e.g. via the coin tray 118, to a position adjacent the light detector 123 so that, during payout, the detector 123 would continue to be illuminated and the blockage of light from the emitter 122 would not be detected by the detector 123. As a result, multiple coins would be dispensed without corresponding decrementation of the counter.

In some devices, the microprocessor would declare an error condition if, following a signal to dispense coins, the detector 123 failed to detect coin passages for a threshold period of time (such as, for example, eight seconds). Even in such a system, it would be possible to manipulate the device by inserting a light source adjacent the detector 123 which became unilluminated periodically, with a period less than the threshold, such as once every eight seconds.

Another manipulation system involved inserting an opaque item adjacent the detector 123 to intentionally block all light from the emitter 122. In this manipulation, the detector 123 would output a signal indicating a single relatively long-duration blockage during a period in which multiple coins may, in fact, be moving along the coin path 128.

In some devices the microprocessor 112 will declare an error condition when the signal 132 indicates a blockage with a duration greater than a predetermined threshold (e.g., 750 milliseconds). Even in such a system, manipulating the opaque device so that it blocks the detector 123 for relatively short periods, (but still long enough to allow 2 or more coins to pass without detection), results in more than N coins being dispensed.

In some cases, the above-described manipulation can be discouraged or avoided by placing mechanical barriers around the optical system 122, 123 and/or moving the optical system to a position which is more difficult to reach through the coin tray 118. Such systems, while of some use, still provide an undesirably large potential for unauthorized manipulation.

One aspect of the present invention involves positioning at least one additional optical detector in a region adjacent the first optical detector but which is positioned so that it does not normally detect light from the light emitter associated with the first optical detector. Such second detector thus has the potential for detecting light from an introduced light source. Such use of a second detector will not necessarily, in itself, assist in detecting a blocking type manipulation.

Another aspect of the present invention involves providing both a first emitter detector pair and a second emitter detector pair downstream of the first pair so that the sequence and timing of blockages that would normally be caused by coin travel cannot be easily duplicated. Such use of upstream and downstream detector pairs will not necessarily, in itself, assist in detecting an introduced light source (since each detector should normally detect light from its corresponding light emitter).

Figure 2:
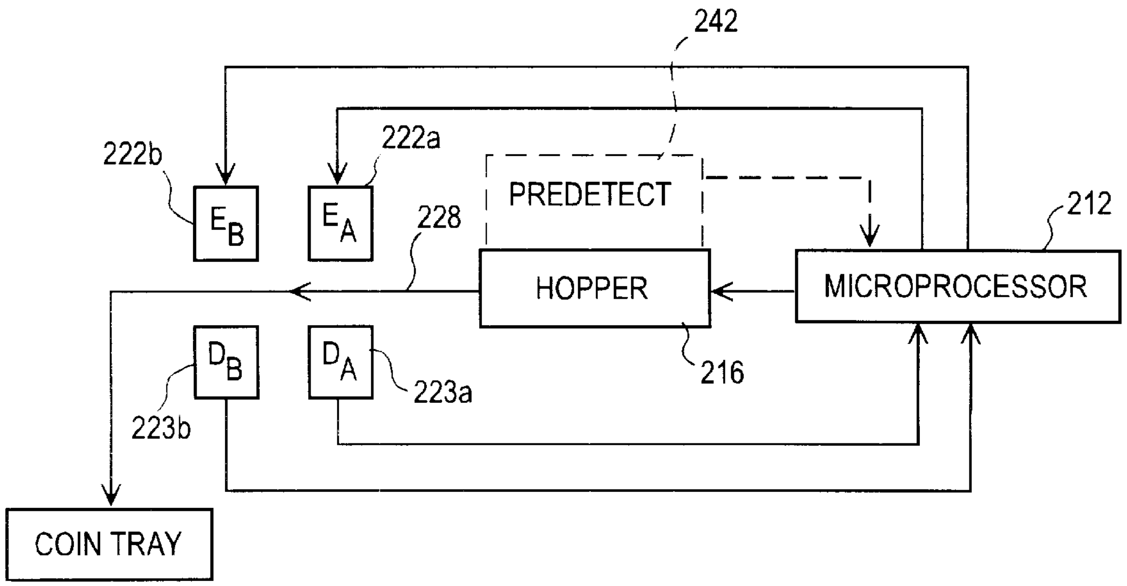
FIG. 2 depicts a coin output system for a gaming terminal in block diagram form 15 according to an embodiment of the present invention.

In one embodiment, both the above-described detection features (detecting an introduced light source, and detecting a blocking device) can be achieved using first and second detector-emitter pairs as depicted in FIG. 2. In one embodiment, the first and second detector-emitter pairs are alternatively pulsed (FIG. 3) so that when the first emitter is emitting, the second emitter is dark (and thus, detection of light by both detectors at the same time is indicative of an introduced light source).

Figure 3:
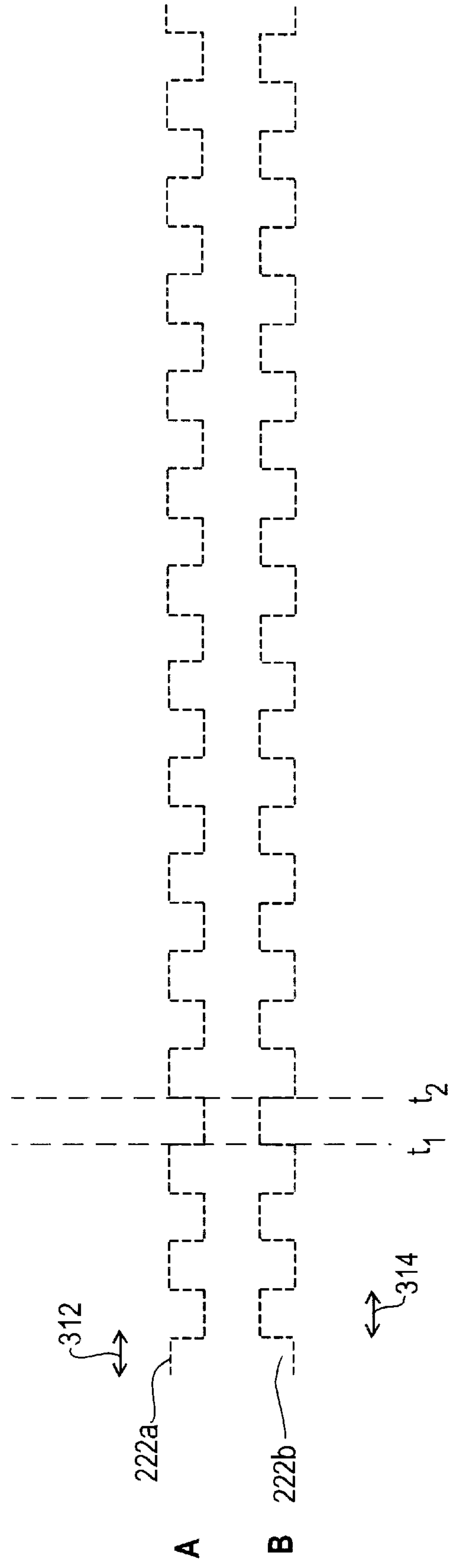
FIG. 3 is a timing diagram showing examples of detector system signals under various conditions.

In the embodiment of FIG. 2, the output system includes an upstream emitter-detector pair (termed pair "A") and a downstream optical emitter-detector pair (termed pair "B"). The microprocessor 212 (or similar control system) controls emitter A **222*a* and emitter B 222*b* so that the two emitters 222*a*, 222*b* will not be illuminated at the same time. One scheme for doing this is depicted in FIG. 3 in which dashed lines show the state of the emitters A and B with the high state indicating illumination and the low state indicating non-illumination. In the embodiment of FIG. 3, each emitter has a 50% duty cycle and emitters A and B are 180° out of phase. Detectors A and B 223*a*, 223*b* are positioned to receive light from the paired emitters 222*a*, 222*b*, respectively, and provide signals indicating receipt of light to the microprocessor 212. When the microprocessor 212 sends a signal to the hopper 216 to begin dispensing coins, the microprocessor will begin monitoring the signals from the detectors 223*a*, 223*b* which are expected to follow the pattern of the emitters (depicted in FIG. 3) until such time as a coin reaches the sensors 223*a*, 223*b*. If, however, at any time during the coin dispensing, the microprocessor detects an indication of illumination at either of the detectors 223*a*, 223*b* during a time when the corresponding emitter 222*a*, 222*b* is in the non-illuminated state, this is an indication that the detector is receiving illumination from a source other than its paired emitter, and thus may be an indication of an introduced light source. Accordingly, when the microprocessor 212 detects a signal indicating illumination at a detector 223*a*, 223*b* during the time when the corresponding light emitter 222*a*, 222*b* is unilluminated, the microprocessor 212 preferably declares an error condition and sends a signal to the hopper 216** to cease coin dispensing.

By establishing a frequency for emitter pulsing which is sufficiently high (preferably sufficiently high that at least emitter A will complete more than one full on/off cycle in a period of time less than the time required for the fastest coin to move from the A pair to the B pair), even a fast-moving coin will be detected by the A pair before it is detected by the B pair. For example, in a worst-case scenario in which a coin reaches the first detector pair **223*a* at time $T_1$, just as the A emitter changes to the unilluminated state, since the frequency is high enough that the coin cannot reach the B detector before the A detector has cycled through at least one on/off cycle, blockage caused by the coin will be detected at time $T_2$ which is a time before the coin has reached the B detector. Accordingly, by making the pulsing frequency sufficiently high, even in the worst case scenario, coins moving normally along the coin path 228** will be detected by the A detector before being detected by the B detector. Furthermore, the delay between the time the coin is first detected by the A detector and the time it is detected by the B detector, (although partly quantized by the step function nature of the light emitter activations), is approximately indicative of the speed of a coin as it moves past the detectors.

These characteristics of expected behavior of the detectors during normal coin movement can be used by the microprocessor 212 to detect other types of manipulation, such as attempted detector blocking by opaque items. In particular, it is believed likely that an attempted insertion of an opaque item or material adjacent the detectors 223*a*, 223*b* would be relatively unlikely to duplicate the sequence resulting from normal coin movement (i.e., blockage of coin detector A 223*a* followed by blockage of detector B 223*b*). Accordingly, when the microprocessor 212 detects an abnormal sequence (such as blockage at detector B 223*b* before blockage at detector A 223*a* or simultaneous blockage at both detectors 223*b*, 223*a*), microprocessor 212 will preferably issue an error signal and send a control signal to the hopper 216 causing the hopper to cease dispensing coins.

Furthermore, even when the proper sequence of blockages is detected, if the delay between blockages is outside an acceptable window (i.e., less than a minimum delay threshold or longer than a maximum delay threshold), the microprocessor 212 preferably issues an error signal and sends a command to the hopper 216 to cease dispensing coins.

Further security in the system can be achieved by configuring or programming the system to dynamically change the acceptable duration or delay in the time that the detectors are blocked. For example, by measuring the time that is required for a particular diameter coin to pass over the detector in a particular machine under normal circumstances, and adding a percentage of that time to an initial value, a new value can be set for the duration which the optic can be broken or blocked. If a detector is blocked for a period longer than the maximum duration blocking duration value, the microprocessor 212 preferably outputs an error signal and sends a control signal to the hopper 216 to cease output of coins.

Optionally, in the embodiment of FIG. 2, a further detector 242 can be positioned in or adjacent the hopper 216, e.g., to sense pinwheel movement and/or to pre-sense the presence of a coin prior to passing the coin to the coin output path 228 and thus past the optics detectors 223*a*, 223*b*. By sensing pinwheel movement and/or coin presence, the system can predict a coin being dispensed onto the coin path 228. If a predicted coin is not detected by the optic detectors 223*a*, 223*b* within a predetermined time, the microprocessor 212 preferably outputs an error message and sends a control signal to the hopper 216 to cease dispensing coins.

Figure 5:
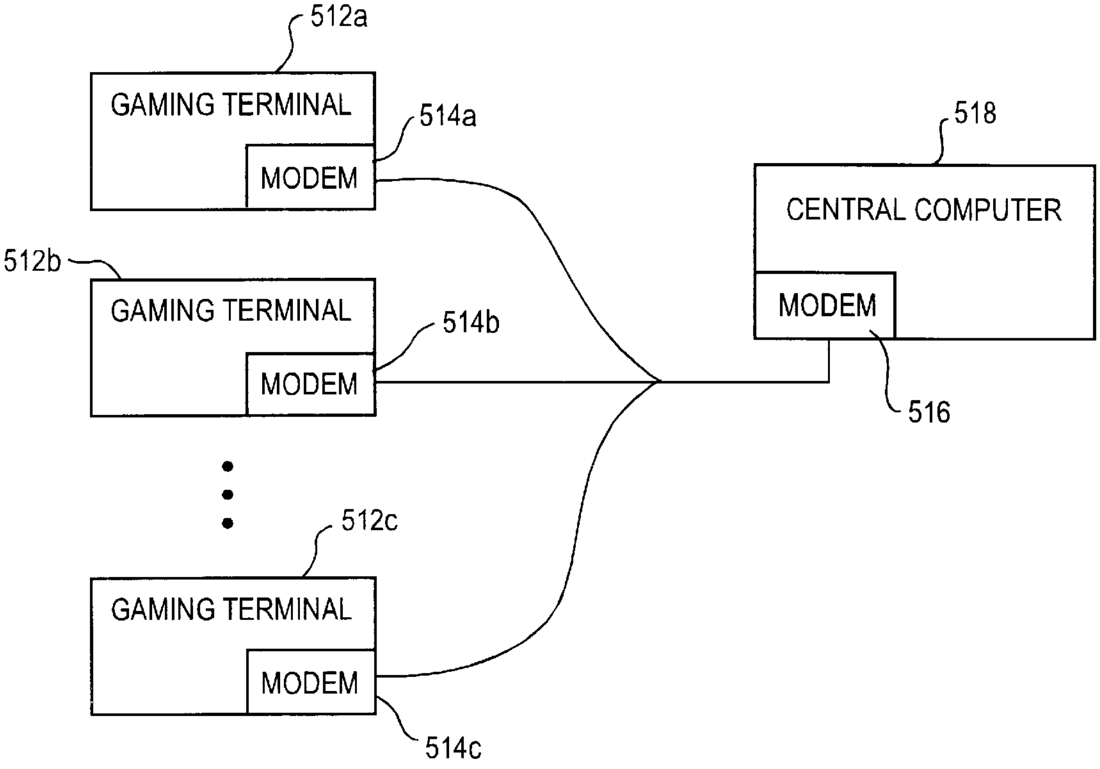
FIG. 5 is a block diagram illustrating a system having several gaming terminals and a central computer.

Error messages which are output by the microprocessor as described above can be used in various ways. The error messages may be stored, e.g. in memory and/or non-volatile media, so that service or security personnel, upon checking the payout-disabled gaming terminal, can obtain an error code to help in identifying the type of manipulation that was detected. In one embodiment, as depicted in FIG. 5, various gaming terminals 512*a–c* are connected, e.g. via modems 514*a–c* to a modem 516 or other communication device of a central computer 518. The central computer 518 may be a management or security station for, e.g. a casino or other gaming establishment or grouping. Error messages may thus be output from gaming terminals to the central computer, e.g. to alert management or security that an event has occurred that may involve unauthorized manipulation of the coin payout sensors or systems.

Figure 4:
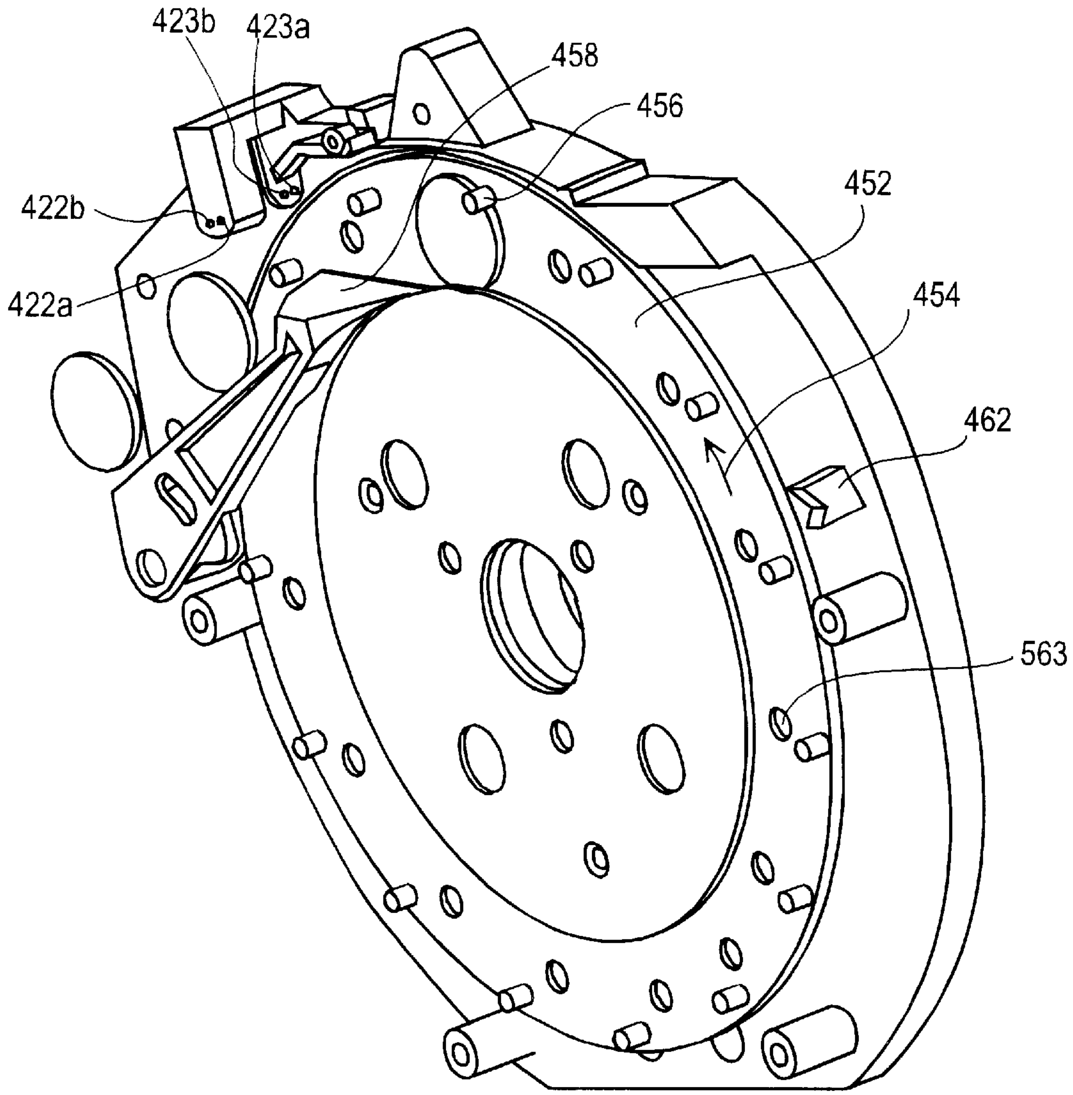
FIG. 4 is a perspective view of a hopper pin wheel and adjacent sensors according to an embodiment of the present invention.

FIG. 4 depicts one example of a pinwheel portion of a payout hopper and adjacent sensors. The embodiment depicted is used in connection with side-eject coin payout implementations, but the present invention can be used in connection with a wide variety of coin pay-out devices, including, without limitation, so-called escalator eject hoppers, non-pinwheel hoppers and other coin pay-out devices of types known to those of skill in the art. In the embodiment depicted in FIG. 4, the A and B light emitters 422*a,b* and detectors 423*a,b* are positioned at the beginning portion of the coin output path, where, it is believed, it will be relatively difficult to position an inserted illumination device or blocking device. In normal use, in response to a pay-out command from the microprocessor, the pinwheel 452 rotates 454, causing the pins 456 to pickup coins which have accumulated in, e.g. an open sided bowl (not shown) adjacent the pinwheel. The rotating pinwheel delivers the coins to a coin knife 458 causing coins to move off the pinwheel and onto a path for eventual delivery to the coin output tray. The initial part of this path moves the coins past the A and B sensor pairs 422*a*, 423*a*, 422*b*, 423*b*. It is not unusual, during normal use, for the pinwheel 452 to be less than fully-loaded with coins. I.e. normally, there will be at least some pins which are not conveying coins. Accordingly, there may be a delay between coins, during normal pinwheel operation, and it is for this reason that, in some cases, continued illumination at a coin output detector of as much as 8 seconds (or more) may be tolerated. According to one embodiment of the invention, however, the pinwheel is provided with a coin sensor 562 which can detect when a particular pin has an adjacent coin. In the embodiment depicted in FIG. 4, the sensor 562 is a reflective optical system for sensing presence of coins through holes 563 in the pinwheel. In this way it is possible to configure the system such that, rather than measuring the delay between sequential coin-caused blockages at sensor A (which, for reasons noted above necessarily is set to a relatively high value, such as 8 seconds, leading to a potential for manipulations which may permit undetected dispensing of multiple coins), the system measures the delay between the time a pinwheel position is detected as containing a coin, and a detected blockage at position A. The maximum value for this latter measured value can be substantially less (such as less than one second) than that which was needed for the previous system so that even if manipulation occurs, it will be detected in, e.g. less than one second, providing a potential for few if any undetected coins to be dispensed. Furthermore, the pre-sensing or prediction sensor 562 is positioned on or adjacent the pinwheel in a location which is believed to be particularly difficult for a user to insert an illumination or blocking device, or to achieve misalignment, breakage or disablement of the sensor. If a pre-sensor 562 is provided, misalignment or breaking of a downstream sensor will become apparent since such broken or misaligned sensor will fail to sense a blockage after the pre-sensor detects the presence of a coin. A number of types of sensor can be used as a pre-sensor, including optical and magnetic sensors.

Figure 6:
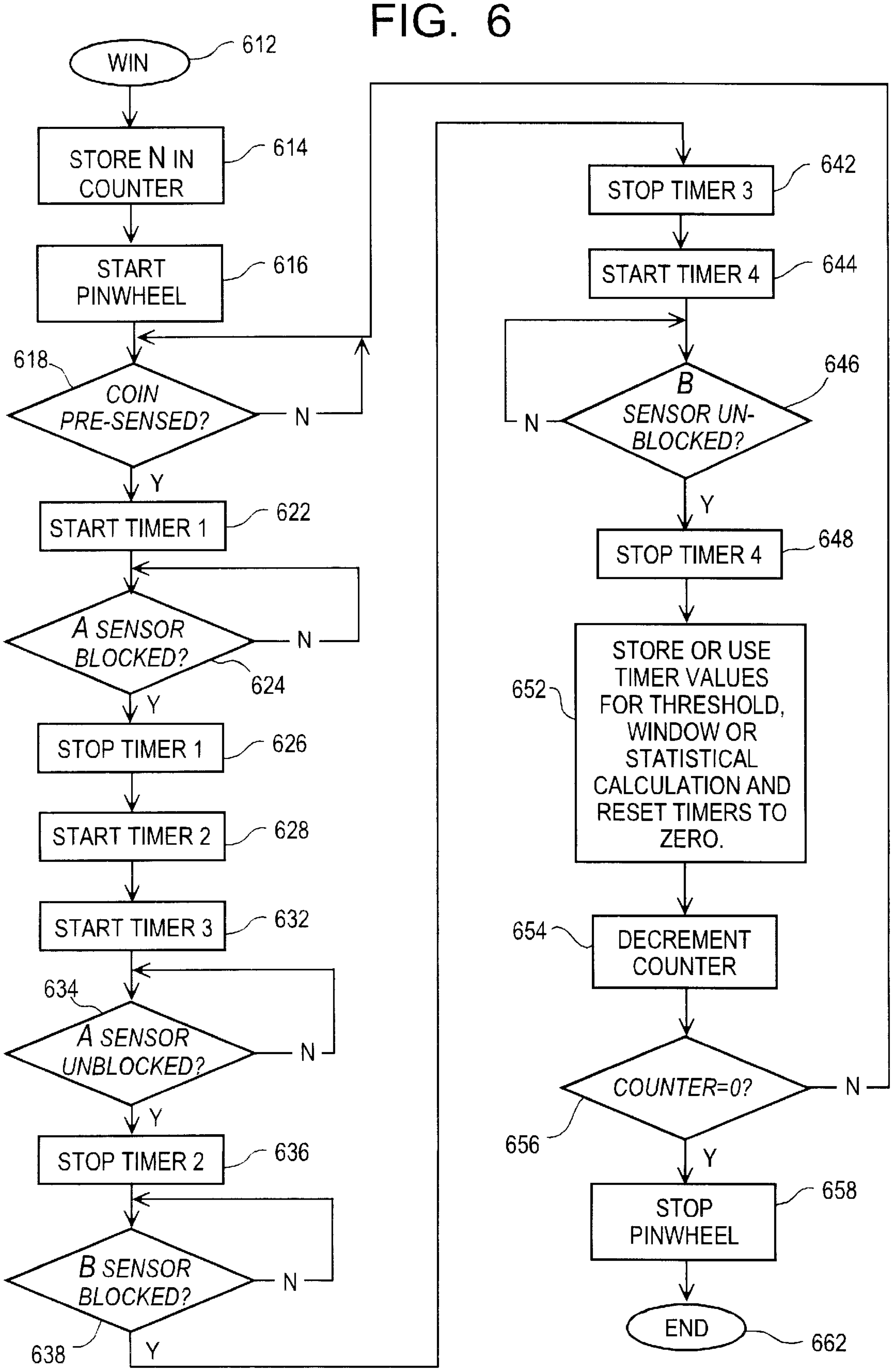
FIG. 6 is a flow chart depicting a procedure according to an embodiment of the present invention.
Figure 7:
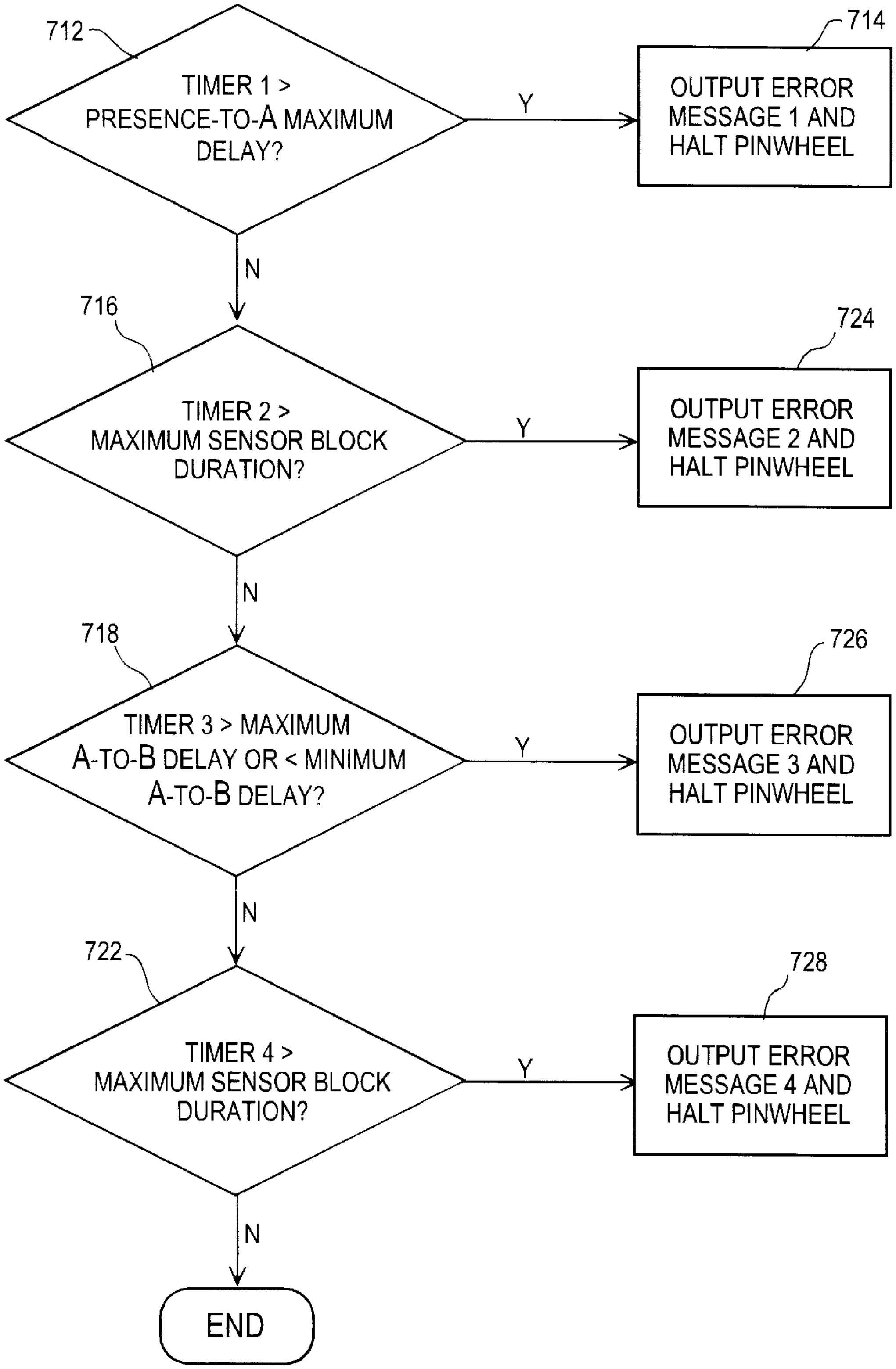
FIG. 7 is a flow chart depicting a procedure according to an embodiment of the present invention.

In practice, as depicted in FIG. 6, when the gaming terminal determines that a win has occurred 612, the microprocessor stores the number of coins to be paid out, denoted N, in a counter or memory location 614. The microprocessor then sends a signal to the hopper to start rotation of the pinwheel 616. When a coin is pre-sensed 618 a first timer (Timer 1) is started 622. The timer can be an electronic hardware timer, or can be implemented in software, e.g. by storing a current system time in a memory location for later comparison with a stop time. When it is determined that the A sensor is blocked 624, Timer 1 is stopped (Or a stop time is stored) 626 and Timers 2 and 3 are started 628, 632. When sensor A becomes unblocked 634, Timer 2 is stopped 636. When the B sensor becomes blocked 638 Timer 3 is stopped 642 and Timer 4 is started 644. Upon unblocking of sensor B 646, Timer 4 is stopped 648. Besides being used for detecting potential unauthorized manipulation (as depicted in FIG. 7), the values from the timers may be stored or used (e.g. in calculating averages) for statistical purposes or for use in calculating windows or thresholds, e.g. for dynamic adjustment of windows or thresholds, as described above 652. After a coin leaves sensor B, the counter is decremented by one 654, and the microprocessor determines whether the counter has counted down to zero 656. If not, the system returns to process the next coin. If the counter has reached zero, the microprocessor outputs a signal to the hopper to stop the pinwheel 658, thus halting payout of coins, and the process ends 662.

The microprocessor compares the values in the timers to various predetermined (or calculated or adjusted) threshold or window values to detect potential unauthorized manipulation. FIG. 7 depicts such a comparison, but it should be understood that comparisons can be done in various ways, such as in an order different from that depicted, by continuously monitoring the values of the timers, by evaluating at pertinent times (such as evaluating each timer value when the timer is stopped) and the like. In the embodiment of FIG. 7, the processor determines 712 whether the value of timer 1 is greater than the maximum permissible delay between detection of a coin by the pre-sense sensor and detection by the A sensor. If so, an error message (preferably one which can be distinguished as indicating this particular type of abnormality or error) is output and the microprocessor sends a message to the hopper to stop the pinwheel 714. In a similar fashion, the microprocessor compares Timer 2 to the maximum sensor block duration 716, compares Timer three to a window defined by the maximum and minimum A-to-B delay 718 and compares Timer 4 to a maximum sensor block duration 722 (which may be the same value as used in step 716, or may be particular to sensor B). In each case, if a timer value outside acceptable upper and/or lower bounds is found, a preferably distinctive error message is output and the pinwheel is halted 714, 724, 726, 728.

Figure 8:
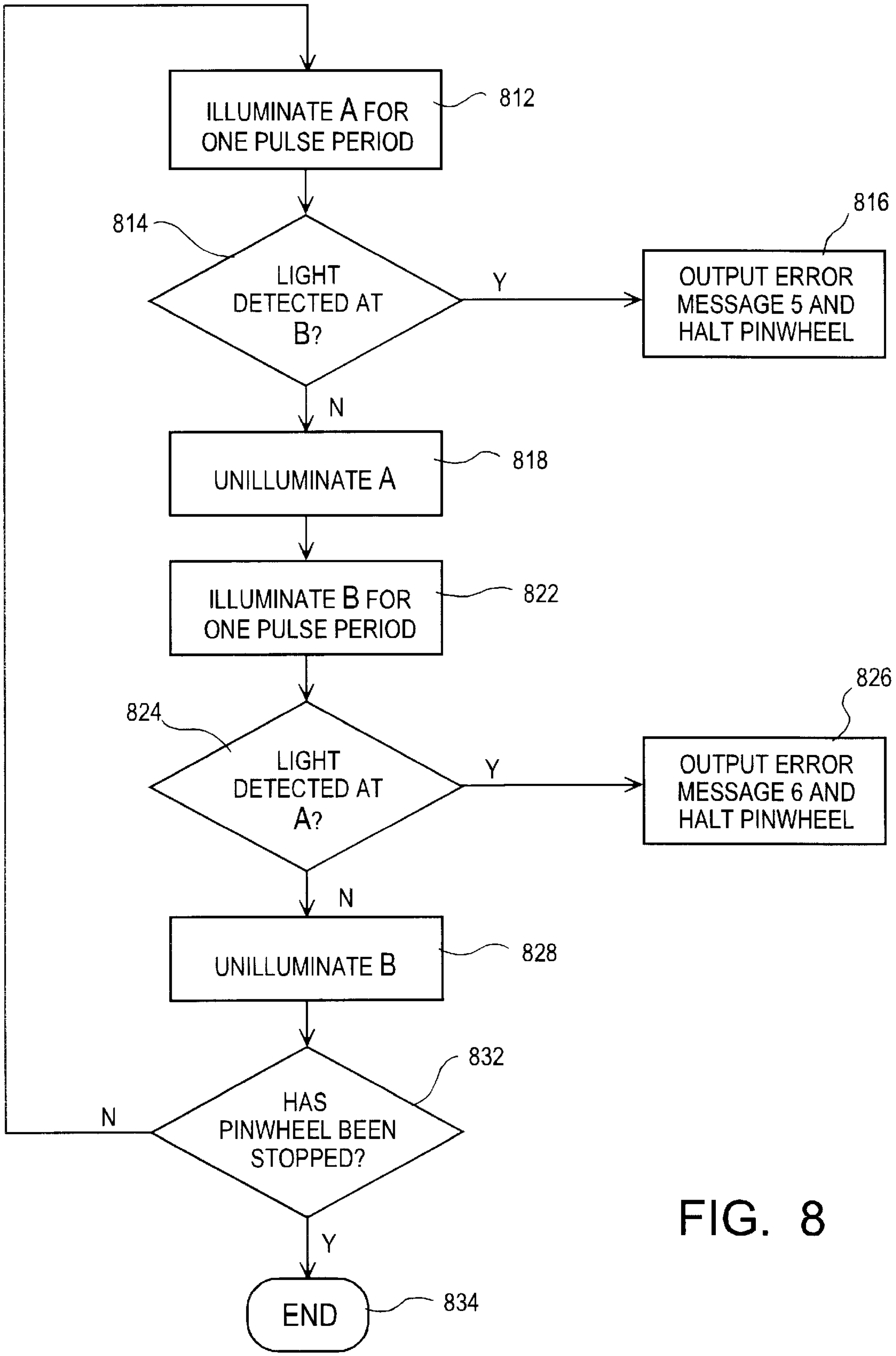
FIG. 8 is a flow chart depicting a procedure according to an embodiment of the present invention.

FIG. 8 shows an example of a procedure for pulsing the radiation or light emitters and using light detection to sense certain abnormalities or errors. Initially the microprocessor (or other controller) will illuminate the A optical emitter 812 for a time period equal to one pulse period (312, FIG. 3). If, during the period of illumination of the A sensor (when the B emitter will normally be unilluminated), light is detected at the B detector 814, the processor will output a preferably distinctive error message and halt the pinwheel 816. Otherwise, at the end of the pulse period 312, the processor will unilluminate optical emitter A 818 and illuminate emitter B 822 for one pulse period 314. If, during the period of illumination of the B sensor (when the A emitter will normally be unilluminated), light is detected at the A detector 824, the processor will output a preferably distinctive error message and halt the pinwheel 826. Otherwise, at the end of the pulse period 312, the processor will unilluminate optical emitter B 828 and check to see if the pinwheel has stopped 832 indicating that payout has ceased and it is no longer necessary to pulse and monitor the sensors, so the process can end 834. Otherwise the process repeats, alternately illuminating sensor A and sensor B.

In light of the above description, a number of advantages of the present invention can be seen. The present invention provides for greater reliability in detection of unauthorized manipulations such as introduction of a light source and/or an opaque blocking material or item. Pulsing of light sources or emitters, under processor or hardware control, assists in detecting both introduction of blocking items and introduction of light sources by the same two detectors. The system preferably can detect direction or apparent direction of coin movement. Timing windows or thresholds may be adjusted for coin size detection and payout time sensitivity. Timing windows or thresholds may be adjusted to increase or relax the level of security. Preferably the system permits sensing of pinwheel movement and/or coin presence in a hopper pinwheel during coin payout.

A number of variations and modifications of the present invention can also be used, although in the depicted configuration, the same sensors are employed in both detecting introduced blocking or opaque materials and introduced light sources, it is possible to provide separate detectors or separate sets of detectors directed to each of these potential manipulations. Although a configuration with the sensors mounted on or adjacent a hopper structure are depicted, other sensor locations can be used, e.g. in combination with mechanical barriers to confound attempts at introducing blocking or light source items. Although two pairs of optical detectors are disclosed, some features of the present invention may be operable by substituting one or more other types of detectors such as magnetic or mechanical detectors, or by providing three or more detectors. Although both emitters are described as being pulsed, at least some features of the present invention are operable when fewer than all emitters are pulsed. Only pulsing patterns can be used, such as less than 50% duty cycle, or different frequencies, e.g. to distinguish emitters. In one embodiment, a pulse output by an optical detector is augmented (such as being electronically lengthened) before it is provided to the microprocessor, in order to assure that the microprocessor can properly recognize the pulse. This feature is particularly useful in connection with relatively small-diameter coins, such as U.S. dimes, that will normally produce a relatively short (e.g. 20 millisecond) pulse. Although a single regular pulsing pattern for the light emitters is disclosed, it is possible to provide changing and/or random pulsing patterns, e.g. to reduce the likelihood of a prediction of a pulsing pattern being used to effect a successful manipulation of the payout system. Although control using a microprocessor has been disclosed, other types of control can be provided including control that involves, e.g., application specific integrated circuits (ASICs), hard-wired control, analog control, and/or programmable gate arrays.

Although the present invention has been described by way of a preferred embodiment and certain variations and modifications, other variations and modifications can also be used, the invention being defined by the following claims.

What is claimed is:

1. A coin payout system for a gaming terminal comprising:

an output hopper for controllably outputting a series of coins;

a first radiation source and first radiation detector positioned such that a coin, output by said output hopper, will pass through a radiation beam detectable by said radiation detector;

a second radiation source and a second radiation detector positioned so that a coin, output by said coin hopper, will travel past said second detector, blocking radiation to said detector after said coin has passed over said first detector;

means for outputting an error signal when a sequence of blockage at said first and second detectors is other than blockage at said first detector followed by blockage at said second detector within a predetermined period of time.

2. A coin payout system, as claimed in claim 1, wherein said means for outputting an error signal comprises a microprocessor.

3. A coin payout system, as claimed in claim 1, wherein said first and second radiation sources comprise infrared light sources.

4. A coin payout system, as claimed in claim 1, wherein said error signal is sufficiently distinctive to distinguish unacceptable blockage timing or sequence from at least one other type of error.

5. A coin payout system for a gaming terminal comprising:

an output hopper for controllably outputting a series of coins;

a first radiation source and first radiation detector positioned such that a coin, output by said output hopper, will pass through a radiation beam detectable by said radiation detector;

at least a second detector radiation detector positioned to avoid detecting radiation from said first radiation source; and means for outputting an error signal when said second detector detects radiation during a time when said first radiation source is emitting radiation.

6. A coin payout system, as claimed in claim 5, wherein said means for outputting an error signal comprises a microprocessor.

7. A coin payout system, as claimed in claim 5, wherein said first and second radiation sources comprise infrared light sources.

8. A coin payout system. As claimed in claim 5, wherein said error signal is sufficiently distinctive to distinguish unacceptable blockage timing or sequence from at least one other type of error.

9. A coin payout system for a gaming terminal comprising:

an output hopper for controllably outputting a series of coins;

a first radiation source and first radiation detector positioned such that a coin, output by said output hopper, will pass through a radiation beam detectable by said radiation detector;

means for outputting an error signal when said first detector detects that radiation from said first source to said first detector is blocked during a period of time which exceeds a duration threshold;

means for adjusting the value of said duration threshold; and wherein said means for adjusting adjusts said duration threshold on the basis of a measurement of the period of time required for a particular diameter coin to pass over the detector under normal circumstances.

10. A coin payout system for a gaming terminal comprising:

an output hopper for controllably outputting a series of coins;

a first radiation source and first radiation detector positioned such that a coin, output by said output hopper, will pass through a radiation beam detectable by said radiation detector;

a second radiation source and a second radiation detector positioned so that a coin, output by said coin hopper, will travel past said second detector, blocking radiation to said detector after said coin has passed over said first detector;

means for alternately pulsing said first radiation source and said second radiation source substantially out of phase with respect to one another.

11. A coin payout system for a gaming terminal comprising:

an output hopper for controllably outputting a series of coins;

a first radiation source and first radiation detector positioned such that a coin, output by said output hopper, will pass through a radiation beam detectable by said radiation detector;

a second radiation source and a second radiation detector positioned so that a coin, output by said coin hopper, will travel past said second detector, blocking radiation to said detector after said coin has passed over said first detector;

means for pulsing at least one of said first radiation source and said second radiation source such that said first radiation source is off during at least some of a period when said second radiation source is on.

12. A coin payout system for a gaming terminal comprising:

an output hopper for controllably outputting a series of coins;

a first radiation source and first radiation detector positioned such that a coin, output by said output hopper, will pass through a radiation beam detectable by said radiation detector;

means for predicting output of a coin from said hopper; and means for outputting an error message when said first detector has not detected blockage within a first maximum delay threshold following a coin output prediction by said means for predicting.

13. Coin payout apparatus for a gaming terminal comprising:

an output hopper for controllably outputting a series of coins;

a first light source and first light detector, said first light detector configured to output a first output signal indicative of whether light is detected by said first light detector, said first light source and first light detector positioned such that a coin, output by said output hopper, will pass through a light beam emitted by said first light source, causing a pulse to be output by said first light detector;

a second light source and second light detector, said second light detector configured to output a second output signal indicative of whether light is detected by said second light detector, said second light source and second light detector positioned such that a coin, after moving past said first light detector, will pass through a light beam emitted by said second light source, causing a pulse to be output by said second light detector;

a processor configured to receive said first and second output signal and to generate an error signal when a sequence of blockage at said first and second detectors is other than blockage at said first detector followed by blockage at said second detector within a predetermined period of time.

14. A coin payout system for a gaming terminal comprising:

an output hopper for controllably outputting a series of coins;

a first light source and first light detector, said first light detector configured to output a first output signal indicative of whether light is detected by said first light detector, said first light source and first light detector positioned such that a coin, output by said output hopper, will pass through a light beam emitted by said first light source, causing a pulse to be output by said first light detector;

at least a second light detector positioned to substantially avoid detecting light from said first light source and to output a second output signal indicative of whether light is detected by said second light detector; and a processor configured to receive said first and second output signals and to generate an error signal when said second detector detects radiation during a time when said first radiation source is emitting radiation.

15. A method for coin payout in a gaming terminal comprising:

controllably outputting a series of coins from an output hopper;

positioning a first radiation source and first radiation detector such that a coin, output by said output hopper, will pass through a radiation beam detectable by said radiation detector;

outputting an error signal when said first detector detects that radiation from said first source to said first detector is blocked during a period of time which exceeds a duration threshold;

adjusting the value of said duration threshold; and wherein said step of adjusting adjusts said duration threshold on the basis of a measurement of the period of time required for a particular diameter coin to pass over the detector under normal circumstances.

16. A method, as claimed in claim 15, wherein said gaming terminal is one of a plurality of gaming terminals coupled to a central computer and wherein said step of outputting an error signal comprises outputting an error signal to said central computer.

17. A method for coin payout in a gaming terminal comprising:

controllably outputting a series of coins from an output hopper;

positioning a first radiation source and first radiation detector such that a coin, output by said output hopper, will pass through a radiation beam detectable by said radiation detector;

positioning a second radiation source and a second radiation detector so that a coin, output by said coin hopper, will travel past said second detector, blocking radiation to said detector after said coin has passed over said first detector;

pulsing said first radiation source and said second radiation source substantially out of phase with respect to one another.

* * * * *